No. 770,182. PATENTED SEPT. 13, 1904.
H. P. MERRIAM.
SAFETY LOCKING DEVICE FOR PROJECTILE FUSES OR OTHER PURPOSES.
APPLICATION FILED MAR. 30, 1901. RENEWED JAN. 4, 1902.
NO MODEL.
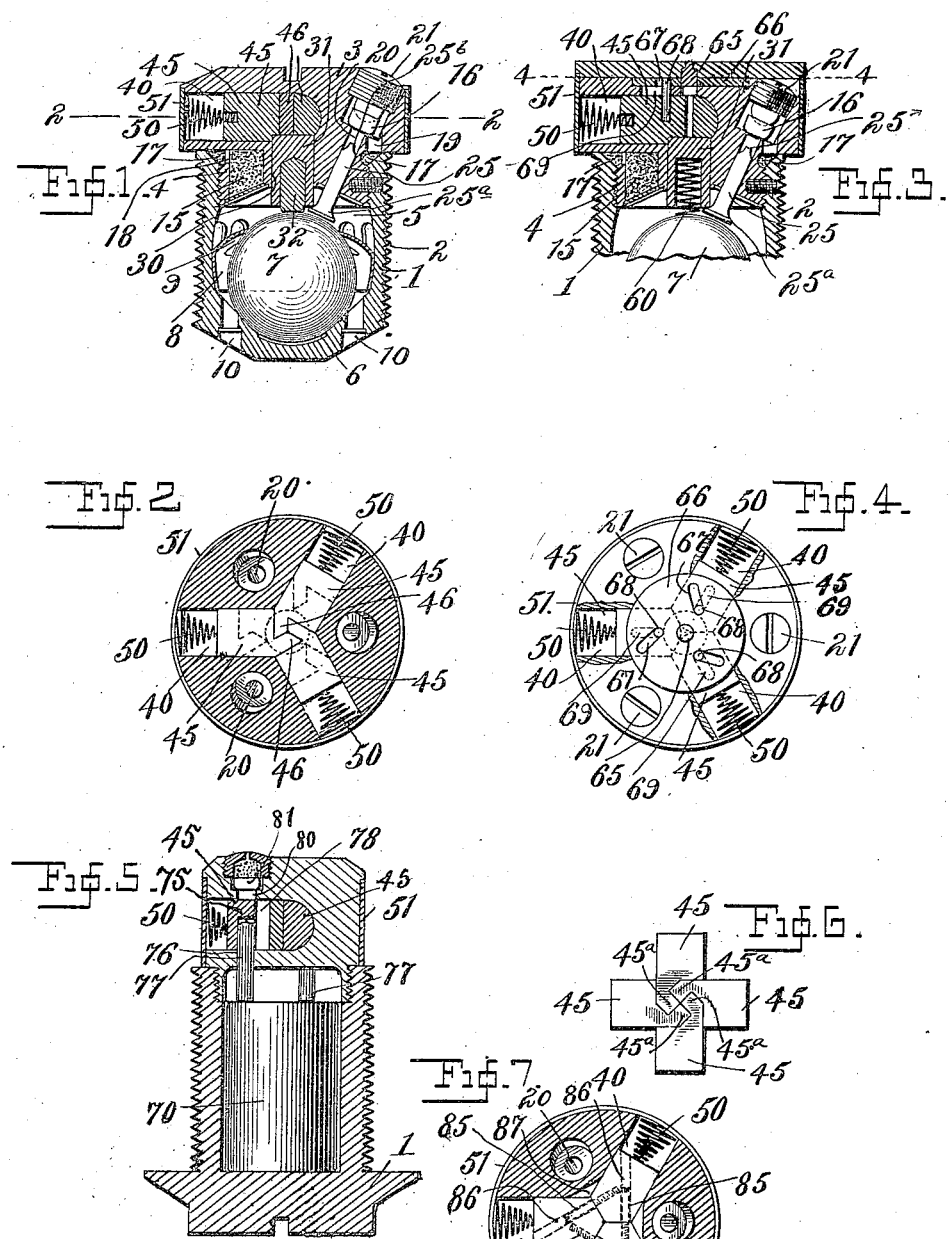

No. 770,182. Patented September 13, 1904.

UNITED STATES PATENT OFFICE.

HENRY P. MERRIAM, OF NEW YORK, N. Y.

SAFETY LOCKING DEVICE FOR PROJECTILE-FUSES OR OTHER PURPOSES.

SPECIFICATION forming part of Letters Patent No. 770,182, dated September 13, 1904.

Application filed March 30, 1901. Renewed January 4, 1902. Serial No. 88,444. (No model.)

*To all whom it may concern:*

Be it known that I, HENRY P. MERRIAM, a citizen of the United States, residing at New York, in the county and State of New York, have invented certain new and useful Improvements in Safety Locking Devices for Projectile-Fuses or for other Purposes, of which the following is a specification.

My invention relates to improvements in devices for securely locking a controlled movable part of a mechanism in its inoperative position. Such devices may be used for many purposes, but I have designed my improvements particularly for use with percussion-fuses for projectiles; and the object of my invention as applied to this use is to simplify and improve the structure and operation of such fuses to insure greater safety in handling the projectiles and at the same time maintain the certainty of exploding the shell after it strikes the target.

My invention consists, broadly, of a plurality of mutually locking or interlocking bolts, pistons, or parts which are capable of free simultaneous movement, but are incapable of individual movement, in combination with a movable part which is normally controlled and held against movement by the said interlocking parts, whereby said controlled part is allowed to operate only when the interlocking parts move simultaneously. I prefer to mount the interlocking parts upon a rotatable body in such a manner that they can be moved simultaneously by centrifugal force.

My invention also consists, broadly, of a controlled movable part in combination with a plurality of centrifugally-released controlling parts, which are arranged to individually and collectively lock the movable part against movement.

My improved locking devices in their application to projectile-fuses, as hereinafter set forth, apply to the class of percussion-fuses in which the hammer-securing devices are actuated (for releasing the hammer in the fuse) by the centrifugal force of the rapidly-revolving shell.

My invention consists more specifically in providing a fuse with a plurality of centrifugally-operated bolts or pistons which interlock or mutually lock each other in their hammer-securing position and which are incapable of moving individually into hammer-releasing position, but can only move into this releasing position by the simultaneous movement of all. These hammer-securing bolts or pistons are preferably arranged to slide in radial chambers or recesses formed in the fuse-body in a plane transverse to its longitudinal axis. These radially-moving hammer-retaining bolts or pistons may be formed with uniform angular locking noses or projections upon their inner ends which will interlock to hold the bolts or pistons in hammer-retaining position and which will allow the bolts or pistons to move into hammer-releasing position only when all of the bolts or pistons move simultaneously. The bolts or pistons may also be shaped to fit snugly together at their inner ends and be connected through suitable intermediate devices, whereby the individual bolts or pistons are prevented from moving alone, but all of the bolts or pistons will be allowed to move freely when they move simultaneously. These intermediate devices for interlocking the bolts or pistons and preventing their movement except when they move simultaneously may be formed in a variety of ways. For instance, I may provide each bolt or piston with a rigidly-secured angularly-projecting pin which has sliding engagement with an angularly-extending recess or cavity in an adjacent bolt or piston, in which case the fuse-body should have laterally-extending cuts or recesses in the walls separating the piston-chambers to allow the lateral movement of said pins when the bolts or pistons move outwardly. The simultaneous movement of the bolts or pistons and the locking of the bolts against individual movement may also be effected by means of a disk or plate rotatably mounted in the fuse-body and formed with inclined slots in which engage pins projecting from the bolts or pistons. The hammer of the fuse is preferably supported in its inoperative position in the fuse-body by means of a longitudinally-movable pin which rests in a suitable socket in the fuse-body and is supported in engagement with the hammer by its engagement with the bolts or pistons which secure the pin and hold it against movement until the bolts or pistons are simultaneously moved into hammer-releasing position, when the securing-pin will be released and the hammer will be free in the cavity of the fuse in readiness to be thrown forward into engagement with the firing-pins at the moment the projectile strikes the target.

In addition to supporting the hammer in its inoperative position the hammer-securing pin, which is supported by the interlocking bolts or pistons, may also engage the heads of the firing-pins, which are mounted in suitable inclined sockets in the fuse-body around the central socket of the hammer-retaining pin. This feature is of considerable importance in connection with the support of the hammer in its inoperative position, as it prevents the contact of the firing-pins with the primers and lessens the liability of the premature explosion of the shell.

As a modification of the intermediate mechanism between the bolts or pistons and the hammer for retaining the hammer in its inoperative position I may provide a plurality of hammer-engaging pins which are supported in sockets in the fuse-body and rest upon the individual locking bolts or pistons, the bolts or pistons being formed with slots or openings through them at proper points to allow the retaining-pins to be pressed forwardly through the bolts or pistons when the latter are thrown into hammer-releasing position by the centrifugal force of the shell. In this form of the device the hammer-retaining pins may also be used as firing-pins, the percussion-caps or fulminates being mounted in the sockets into which pins project, either in the bolts or pistons or in the fuse-body beyond the openings in the bolts or pistons in proper position to be engaged by the combined firing-pins and hammer-supporting pins when the shell strikes the target. In this form of the device, as well as in the preferred form above referred to, it will be observed that the hammer-securing bolts or pistons also serve the purpose of holding the firing-pins in inoperative position.

In order that my invention may be fully understood, I will first describe the same with reference to the accompanying drawings and afterward point out the novelty with more particularity in the annexed claims.

I have confined the illustration and description of my invention to several of its applications to fuses for projectiles, but I would have it understood that I do not limit myself to this application of my invention.

In said drawings, Figure 1 is a longitudinal sectional elevation of a fuse embodying my improvements. Fig. 2 is a transverse sectional view of the same, taken on the line 2 2 of Fig. 1. Fig. 3 is a detail view similar to Fig. 1, showing slight modifications. Fig. 4 is a view similar to Fig. 2, taken on the line 4 4 of Fig. 3. Fig. 5 is a view similar to Fig. 1, showing a further modification. Figs. 6 and 7 are detail plan views of modified arrangements of the interlocking hammer-securing bolts or pistons.

My improvements in fuses are applicable to any form of percussion-fuse, whether it be designed for a "point-fuse" or a "base-fuse." In Figs. 1 and 2 the improvements are shown applied to a point-fuse. In Fig. 5 a modification of the improvement is shown applied to a base-fuse.

Referring first to Figs. 1 and 2, 1 is the body of the fuse, externally threaded at 2 and having a head 3 formed with the central threaded reduced portion 4, which is threaded into the socket or cavity of the body 1. The socket or cavity 5 of the body 1 is formed with a seat or recess 6, in which normally rests the ball-hammer 7. The hammer 7 is surrounded by a spring-band 8, formed with integral spring-fingers 9, which are bent inwardly into engagement with the hammer for maintaining it upon its seat under certain conditions. 10 10 are ports or passages leading through the inner end of the fuse-body 1 for the passage of the flash from the magazines of the fuse (hereinafter referred to) to the bursting charge of the shell. Within the head 3 of the fuse are mounted the primers and their firing-pins, the magazines of powder which are ignited by the explosion of the primers and flash through the cavity of the fuse-body, and the securing device for holding the firing-pins and the hammer in inoperative position. In this particular form of the fuse (shown in Figs. 1 and 2) I have arranged a series of three powder-magazines 15 at equal distances apart within the fuse-head, and three primers 16 of ordinary construction intermediately of the magazines and communicating with the magazines through a train of powder in the annular channel 17, formed between the fuse-body 1 and head 3 and communicating with the powder-magazines 15 through the ports or openings 18 and with the primers through the ports 19. This arrangement is such that if any one of the primers is set off it will flash into and ignite the powder-train in the annular channel 17, through which the flash will pass and set off the three magazines of powder, which will flash through the cavity of the fuse and ignite the bursting charge of the shell. The three primers 16 are mounted at the outer ends of the inwardly-inclined sockets 20, in which rest the firing-pins 25, formed with flared heads 25$^a$ and pointed ends 25$^b$. The primers 16 are held within their sockets at the ends of the recesses 20 by means of the anvil-screws 21.

30 is a socket or recess formed centrally within the fuse-head 3, and 31 is a longitudinally-movable hammer-retaining pin resting loosely within the socket 30 and formed at its inner end with a steel hammer-engaging portion 32. This pin 31 is held normally in the position shown in Fig. 1, in which position it engages the hammer 7 and holds it firmly in its seat 6 in the fuse-body, and also the flaring-heads 25ª of the firing-pins to hold them in inoperative position in their recesses. The means for holding the hammer-securing pin in its inoperative position and for releasing it at the proper time to place the hammer and firing-pins in readiness for exploding the shell constitutes the main part of my invention, which I will now describe.

The fuse-head 3 has bored into it a series of three radial channels 40, which are arranged at an angle of one hundred and twenty degrees apart and are located directly over the three powder-magazines 15, above described. These channels 40 meet in the center of the fuse-head 3 and are in open communication with the central recess or socket 30, in which is mounted the hammer-securing pin 31. Mounted within the three radially-extending channels 40 are the three bolts or pistons 45, each one of which is formed at its inner end with an angular projection or nose 46. The projections or noses 46 of the bolts or pistons 45 are identical and form complements of each other, so that when the bolts or pistons are in their inner or hammer-retaining position the noses or projections will mutually interlock—that is, the nose of each bolt interlocks with the nose of one of the others—so that no one of the bolts or pistons can be moved outwardly individually; but all can readily be moved outwardly if they are moved simultaneously. The locking noses or projections upon the inner ends of the bolts or pistons 45 extend at an angle of thirty degrees from the bolts or pistons, and their inner ends are beveled at the same angle, so that the three projections or noses of the bolts will fit snugly together and completely close the recess or socket 30, within which the securing-pin 31 rests, said securing-pin engaging the noses or projections of the bolts or pistons and being held thereby into engagement with the hammer and the firing-pins.

In the outer end of each of the radial channels 40 is mounted a spiral spring 50, which engages the end of the bolt or piston 45 and is held in engagement by means of a thin metal band 51, which surrounds the fuse-head 3.

In Figs. 3 and 4 I show a slightly-modified form of my improved fuse. The primers, powder-magazines, firing-pins, and hammer are the same as above described. The securing-pin for the firing-pins and hammer is very similar to the form just described; but in place of the steel hammer-engaging part 32 I have hollowed out the pin 31 and placed therein an expansion-spring 60, which engages the hammer 7 and may be relied upon to take the place of the hammer-securing spring 89, (shown in Fig. 1,) but which is also of value in assisting the forward movement of the hammer-retaining pin 31 after the interlocking bolts or pistons are thrown outwardly in their channels. In this modified form of the device I have also changed the arrangement of the hammer-securing bolts or pistons in that the inner ends of the bolts or pistons do not have the interlocking noses or projections, but are merely beveled off to fit snugly together. To take the place of the interlocking noses or projections of the preferred arrangement of the devices shown in Fig. 1, I mount upon a central stud 65 of the fuse-head a rotary disk or plate 66, in which is cut a series of three inclined slots 67. Projecting upwardly from the bolts or pistons 45 are the pins or lugs 68, which pass through the radial slots 69, formed in the walls of the channels and engage at their upper ends in the inclined slots 67 of the rotary disk 66. It will be observed that with this arrangement all of the locking bolts or pistons will have to move outwardly simultaneously, as the individual movement of any one is resisted by the others through the pin-and-slot connection with the rotary disk. The bolts can, however, move freely when they all move simultaneously.

In Fig. 5 I have shown a further modification of my invention, in which a cylindrical hammer 70 is arranged to be supported by means of a series of three combined hammer-securing pins and firing-pins. In this form of the device I have arranged the fuse as a base-fuse. Each of the three bolts or pistons 45 (formed as shown in Figs. 2, 4, 6, or 7) has a transverse slot or channel 75 cut part way through it, and resting in this slot or channel 75 and in the opening 76 in the fuse-body is one of the series of combined hammer-retaining and firing pins 77. The slot 75 is continued at 78 entirely through the bolt or piston 45 and continued at 80 in line with the recess or socket 76, in which channel or recess 80 is mounted a primer 81, into contact with which the firing-pin is forced by the hammer when the shell strikes the target. In this form of the fuse it will be observed that the plurality of combined hammer-retaining and firing pins are held in engagement with the hammer (for holding the hammer in its inoperative position in the fuse-cavity) and out of engagement with the primers while the interlocking bolts or pistons are in their inner position. As soon as the locking bolts or pistons are moved outwardly by the centrifugal force of the shell the hammer-retaining and firing pins are free to move forwardly through the openings or recesses in the bolts or pistons until they rest upon the primers, which are supported in line with said pins. The release of the hammer-retaining and firing pins releases the hammer in the chamber of the fuse-body and it is free to strike the pins when the shell hits the target. The primers in this form of fuse are arranged to fire any suitable magazine, which is not shown.

In Fig. 6 I show an arrangement of a series of four interlocking bolts or pistons 45, in which case it will be observed that the locking noses or projections 45ª upon the inner ends of the bolts or pistons will extend at an angle of forty-five degrees from the bolts or pistons. The number of interlocking bolts or pistons may be changed without departing from the spirit of my invention.

In Fig. 7 I show a further modification of the interlocking means for preventing individual movement of the bolts or pistons and allowing free simultaneous movement. In this arrangement the inner ends of the bolts or pistons are shaped to fit snugly together, as in Fig. 4. Projecting from one of the inner faces of each bolt or piston 45 is a pin or rod 85, which extends from the bolt or piston at an angle of thirty degrees to the longitudinal axis of the bolt or piston. This pin or rod 85 fits and slides in a socket 86, formed in an adjacent bolt or piston and extending at an angle of thirty degrees to the longitudinal axis of its bolt or piston. Each bolt or piston of the series of three has a pin or rod 85 projecting at an angle from it and rigidly secured to it, and each bolt or piston is formed with an angularly-extending socket 86, into which one of the pins or rods 85 projects. Lateral cuts or recesses 87 are formed in the fuse-body to permit the lateral movement of the pins or rods 85 when the bolts or pistons move outwardly simultaneously. It will be clear that any movement of one of the bolts or pistons individually will be resisted by the pins 85, connecting said piston with the other two. When, however, the bolts or pistons move simultaneously under the centrifugal force of the rapidly-revolving shell, it will be observed that the movement of the bolts or pistons at an angle to each other will allow for the lateral movement of the rigidly-connected pins or rods and the bolts or pistons will move freely in their sockets to release the hammer and firing-pins, as already explained.

The operation of my improved fuse may be briefly described as follows: When the shell equipped with my improved fuse is shot from the gun, it has imparted to it a rotating as well as a forward impulse. The rapid revolution of the shell as it travels through the gun and afterward through the air tends to throw outwardly the series of laterally-extending locking bolts or pistons; but until the centrifugal force exerted upon these parts is sufficient to overcome the friction of the bolts or pistons in their sockets (and this friction is of considerable magnitude while the shell is gaining in velocity in the gun) and the pressure of their springs and the air-cushions formed in the upper ends of their channels said bolts or pistons will not be moved outwardly. At the moment, however, that the centrifugal force is sufficiently strong to overcome these retarding influences upon the bolts or pistons said bolts or pistons will be thrown outwardly simultaneously in their channels, and this will leave the hammer-retaining pin (or pins) free to move forward in the fuse-head, which it (or they) will do immediately by reason of the fact that the flight of the shell is more or less retarded by the friction of the air, while the inertia of the hammer-securing pin (or pins) and hammer will tend to move them forwardly in the fuse-body. This tendency to move forwardly in the fuse-body on the part of the hammer is resisted by the spring 89, which engages the hammer; but as there is nothing to prevent the forward movement of the hammer-retaining pin it moves forward in its socket out of the path of the hammer and the firing-pins. If for any reason the friction upon the hammer-securing pin should prevent its free forward movement by reason of its inertia, the expansion-spring shown in Fig. 3 in the drawings will assist it in its forward movement. Still it is not absolutely necessary that this pin should be in its extreme forward position before the shell strikes the target. The firing-pins also move forwardly in their sockets into engagement with the primers. When the shell strikes the target, the hammer will be suddenly thrown into engagement with the heads of the firing-pins and one or more of the primers will be fired and the flash will pass through the powder train and magazines into the bursting charge of the shell.

I am aware that it has been proposed to provide percussion-fuses with centrifugally-operated means for releasing the hammer; but I am not aware that it has ever been proposed to provide a fuse or any other device of the character described with a plurality of centrifugally-released controlling parts which are arranged to individually and collectively lock a movable part (such as a hammer or a securing-pin) against movement. I am also not aware that it has ever been proposed to provide a plurality of mutually-interlocking hammer-securing devices which are adapted to be moved into hammer-releasing position by simultaneous movement caused by centrifugal force and in which the individually-locking devices cannot be moved separately.

While I have described and illustrated my invention as applied to a fuse for projectiles, I would have it understood that the main feature of my invention—viz., the mutually locking or interlocking bolts, pistons, or parts which are capable of free simultaneous movement, but effectively prevent the individual movement of any one of the bolts, pistons, or parts, in combination with a movable part which is normally held against movement by the series of interlocking bolts, pistons, or parts—is of broader application. I desire to cover this combination of elements in its broadest sense for whatever purpose it may be employed.

While I have shown and described in the present application a projectile-fuse comprising a fuse-body, a primer supported in the fuse-body, a firing-pin movably mounted in the fuse-body in operative relation to the primer, a hammer also movably mounted in the fuse-body independent of and in operative relation to the firing-pin, and centrifugally-released securing means normally holding the firing-pin in its inactive position away from the primer and also normally holding the hammer in inactive position, I would have it clearly understood that I do not claim this construction of fuse in my present invention, since such structure is broadly claimed in my copending divisional application, Serial No. 217,517, filed July 21, 1904. The claims in my present case are now confined to the structure of the securing means comprising interlocking centrifugally-operated parts which are capable of simultaneous movement and incapable of individual movement.

Having thus fully described my invention, the following is what I claim as new therein and desire to secure by Letters Patent:

1. In a device of the character described, the combination of a controlled movable part, with a plurality of centrifugally-operated controlling parts which are normally free to move simultaneously and are incapable of individual movement, substantially as set forth.

2. In a device of the character described, the combination of a controlled movable part, with a plurality of centrifugally-operated controlling parts, and means normally preventing the movement of the controlling parts and adapted to automatically release them when they are moved simultaneously by centrifugal force, substantially as set forth.

3. In a device of the character described, the combination of a controlled movable part, with a plurality of centrifugally-operated controlling parts, and means actuated by the centrifugal movement of the parts, adapted to insure the simultaneous movement of the controlling parts, and normally prevent the individual movement of said controlling parts, substantially as set forth.

4. In a device of the character described, the combination of a controlled movable part, with a plurality of radially-movable controlling parts, and means normally preventing the individual movement of the controlling parts, and compelling the simultaneous movement of said controlling parts when they are operated, substantially as set forth.

5. In a device of the character described, the combination of a longitudinally-movable controlled part, with a plurality of radially-movable controlling parts, and means normally preventing the individual movement of the controlling parts and compelling the simultaneous movement of said controlling parts when they are operated, substantially as set forth.

6. In a device of the character described, the combination of a controlled movable part, with a plurality of centrifugally-operated controlling parts having means for mutually locking or interlocking them, said interlocking means preventing the individual movement of any one of the interlocked parts and allowing the free simultaneous movement of all of said parts, substantially as set forth.

7. In a device of the character described, the combination of a controlled movable part, with a plurality of radially-movable mutually locked or interlocked controlling parts which are free to move simultaneously and are held against individual movement, substantially as set forth.

8. In a device of the character described, the combination of a longitudinally-movable controlled part, with a plurality of mutually locked or interlocked controlling parts mounted to move radially in a plane transverse to the movement of said controlled part, said controlling parts being free to move simultaneously and held against individual movement, substantially as set forth.

9. In a device of the character described, the combination of a plurality of controlled movable parts, with a plurality of mutually locked or interlocked controlling parts which are free to move simultaneously and are held against individual movement, substantially as set forth.

10. In a device of the character described, the combination of a controlled movable part, with a plurality of interlocked controlling parts, each of said controlling parts engaging the controlled part and held against individual movement, and the said controlling parts being free to move simultaneously, substantially as set forth.

11. In a device of the character described, the combination of a controlled movable part, with a plurality of interlocked controlling parts which are free to move simultaneously, each of said controlling parts normally engaging and locking another controlling part, substantially as set forth.

12. In a device of the character described, the combination of a supporting-body, and a controlled movable part freely mounted in a socket or recess in said body, with a plurality of interlocked controlling parts movably mounted in recesses or sockets in said body in a plane transverse to the controlled part, and normally engaging and holding said controlled part, said interlocked controlling parts being free to move simultaneously in their sockets for releasing the controlled part and each of the controlling parts being held against individual movement, substantially as set forth.

13. In a device of the character described, the combination of a supporting-body, formed with a longitudinal socket or recess and a plurality of radially and transversely extending sockets or recesses communicating with said longitudinal socket or recess, a controlled part movably mounted in said longitudinal socket or recess, and a plurality of mutually locked or interlocked controlling parts slidingly mounted in said radial sockets or recesses and held against individual movement, but free to move simultaneously, substantially as set forth.

14. In a device of the character described, the combination of a controlled movable part, with a plurality of centrifugally-operated relatively movable controlling parts normally holding said controlled part in its inactive position and adapted, by their relative movement, to release said controlled part, said controlling parts being normally free to move simultaneously by centrifugal force and incapable of independent movement, substantially as set forth.

15. In a device of the character described, the combination of a controlled movable part, with a plurality of securing devices arranged to normally secure the controlled movable part against motion and adapted, when released, to move longitudinally with said controlled part, and centrifugally-operated controlling parts for locking said securing devices against motion, said controlling parts being normally free to move simultaneously by centrifugal force and held against individual movement, substantially as set forth.

16. In a device of the character described, the combination of a controlled movable part, with a securing part arranged to normally prevent the movement of the controlled part and adapted, when released, to move longitudinally with said controlled part, and a plurality of centrifugally-operated bolts or pistons capable of simultaneous movement and incapable of individual movement, said bolts or pistons being arranged to lock said securing part against motion, substantially as set forth.

17. In a fuse for projectiles, the combination of a fuse-body, a hammer movably supported in the fuse-body, and a plurality of centrifugally-operated hammer-controlling devices sustaining the hammer and normally capable of free simultaneous movement under the action of centrifugal force to free the hammer and incapable of individual movement, substantially as set forth.

18. In a fuse for projectiles, the combination of a fuse body, a hammer supported in the fuse-body, and a hammer-controlling device comprising a plurality of mutually locking or interlocking bolts or pistons capable of simultaneous movement and incapable of individual movement, substantially as set forth.

19. In a fuse for projectiles, the combination of a fuse-body, a hammer supported in the fuse-body, and a hammer-controlling device comprising a plurality of centrifugally-operated mutually locking or interlocking bolts or pistons capable of simultaneous movement and incapable of individual movement, substantially as set forth.

20. In a fuse for projectiles, the combination of a fuse-body, a hammer supported in the fuse-body and adapted, when released, to move longitudinally in the fuse-body, and a hammer-controlling device comprising a plurality of bolts or pistons movably mounted in transversely-extending sockets or recesses formed in the fuse-body, and means for interlocking said bolts or pistons, whereby the bolts or pistons will be free to move simultaneously and will be held against individual movement, substantially as set forth.

21. In a fuse for projectiles, the combination of a fuse-body, a hammer supported in the fuse-body and adapted, when released, to move longitudinally in the fuse-body, said fuse-body being formed with a plurality of sockets or recesses extending transversely and radially from its central longitudinal axis; and a plurality of centrifugally-operated interlocking bolts or pistons movably mounted in said radial sockets or recesses and capable of free simultaneous movement and incapable of individual movement, substantially as set forth.

22. In a fuse for projectiles, the combination of a fuse-body, a hammer movably supported in the fuse-body, and a hammer-controlling device comprising a plurality of interlocking bolts or pistons, each bolt or piston having a projecting part which engages and locks another bolt or piston, whereby the bolts or pistons are free to move simultaneously but are incapable of individual movement, substantially as set forth.

23. In a fuse for projectiles, the combination of a fuse-body, a hammer movably supported in the fuse-body, and a hammer-controlling device comprising a plurality of interlocking bolts or pistons, each bolt or piston having a rod or pin projecting at an angle from it and engaging in an angularly-extending socket or recess formed in an adjacent bolt or piston, whereby the bolts or pistons are free to move simultaneously and are incapable of individual movement, substantially as set forth.

24. In a fuse for projectiles, the combination of a fuse-body, a hammer movably supported in the fuse-body, a hammer-securing pin, a plurality of centrifugally-operated controlling devices adapted to individually and collectively engage and lock the securing-pin in hammer-securing position, and means, actuated by the controlling devices when they are centrifugally operated, to insure the simultaneous movement of said controlling parts, said means normally preventing the movement of the controlling devices, substantially as set forth.

25. In a fuse for projectiles, the combination of a fuse-body, a hammer movably mounted in the fuse-body, a plurality of interlocking bolts or pistons capable of free simultaneous movement and incapable of individual movement, and a hammer-securing pin engaging the hammer and supported by the interlocking bolts or pistons, substantially as set forth.

26. In a fuse for projectiles, the combination of a fuse-body, a hammer movably supported in the fuse-body, a firing-pin movably mounted in the fuse-body independently of the hammer, a securing-pin engaging the firing-pin, and a plurality of centrifugally-operated devices engaging the securing-pin and capable of simultaneous movement and incapable of individual movement, substantially as set forth.

27. In a fuse for projectiles, the combination of a fuse-body, with a firing-pin movably mounted in the fuse-body, and a plurality of centrifugally-operated relatively and simultaneously movable controlling parts arranged to normally hold said firing-pin in its inactive position and adapted by their relative movement to free the firing-pin, and means preventing the independent movement of said controlling parts, substantially as set forth.

28. In a fuse for projectiles, the combination of a fuse-body, a hammer movably mounted in the fuse-body, a firing-pin movably mounted in the fuse-body independently of the hammer, a securing-pin adapted to independently engage the hammer and firing-pin and hold them in inoperative position, and a plurality of centrifugally-operated devices adapted to normally engage the securing-pin and capable of simultaneous movement and incapable of individual movement, substantially as set forth.

29. In a fuse for projectiles, the combination of a fuse-body, a hammer movably mounted in the fuse-body, a firing-pin also movably mounted in the fuse-body, and a plurality of interlocking bolts or pistons capable of free simultaneous movement and incapable of individual movement, said interlocking bolts or pistons being arranged to hold the hammer and firing-pin in inoperative position, substantially as set forth.

30. In a fuse for projectiles, the combination of a fuse-body, a hammer movably mounted in the fuse-body, a firing-pin also movably mounted in the fuse-body, a securing-pin engaging the hammer and firing-pin for holding them in inoperative position, and a plurality of interlocking bolts or pistons engaging and sustaining the securing-pin, said interlocking bolts or pistons being free to move simultaneously and incapable of moving individually, substantially as set forth.

HENRY P. MERRIAM.

Witnesses:
J. GREEN,
WM. E. KNIGHT.